Nov. 20, 1951    C. E. BRICKER    2,575,578
LINK MOUNTED BRAKE
Filed June 14, 1947    2 SHEETS—SHEET 1

INVENTOR.
CARL E. BRICKER
BY
ATTORNEY

Nov. 20, 1951

C. E. BRICKER 2,575,578

LINK MOUNTED BRAKE

Filed June 14, 1947

INVENTOR.
CARL E. BRICKER
BY

ATTORNEY

Patented Nov. 20, 1951

2,575,578

UNITED STATES PATENT OFFICE 2,575,578

LINK MOUNTED BRAKE

Carl E. Bricker, Akron, Ohio, assignor to Wingfoot Corporation, Akron, Ohio, a corporation of Delaware Application June 14, 1947, Serial No. 754,705

11 Claims. (Cl. 188—152)

This invention relates to brakes, and, more particularly, to brakes for use on vehicles, such as automobiles and airplanes, and is specifically concerned with single-disc, spot-pressure type brakes, and with means for mounting the same.

It is the general object of the invention to provide an inexpensive, but rugged brake assembly which will be fully operative over long periods with a minimum of attention and repair and incorporating mechanism providing for brake wear and brake clearance.

Another object of the invention is the provision of means for mounting a single-disc, spot-type brake, said means functioning to insure full surface contact of braking surfaces even after brake wear, and operating to establish braking clearances after each application of the brake.

The foregoing objects of the invention, and other objects which will become apparent as the description proceeds, are achieved by the provision of a brake combination including a fixed member, a rotatable member, a brake disc carried with the rotatable member, a C-shaped element extending around the disc, means carried by the element for applying braking pressure to one side of the disc, and link means pivotally securing the element to the fixed member and allowing movement of the element into full surface engagement with the disc upon actuation of the means for applying braking pressure. Preferably incorporated with the link means are spring means to effect a spring back of the braking parts of the combination so that adequate clearance is provided between all parts of the brake when the brake is not actuated.

For a better understanding of the invention, reference should be had to the accompanying drawings, wherein.

Figure 1:
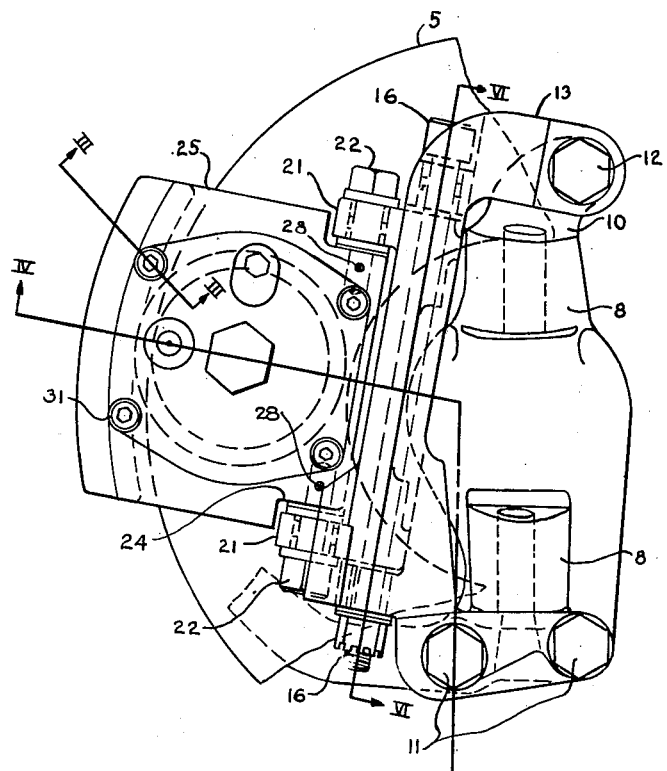
Fig. 1 is a side elevation, partly broken away, of one embodiment of the invention.
Figure 6:
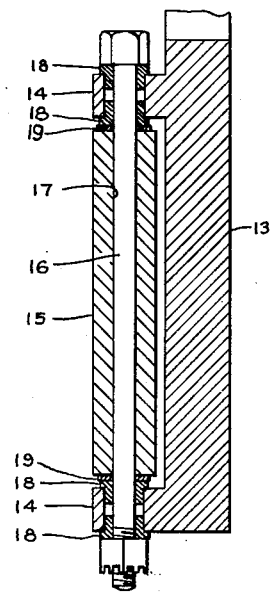
Figure 7:
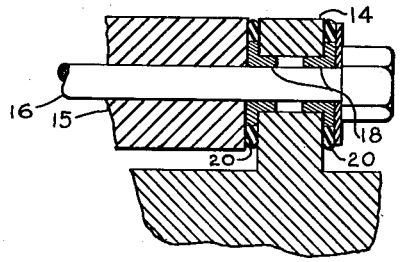
Figure 8:
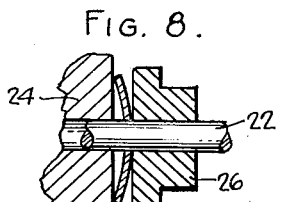
Figure 5:
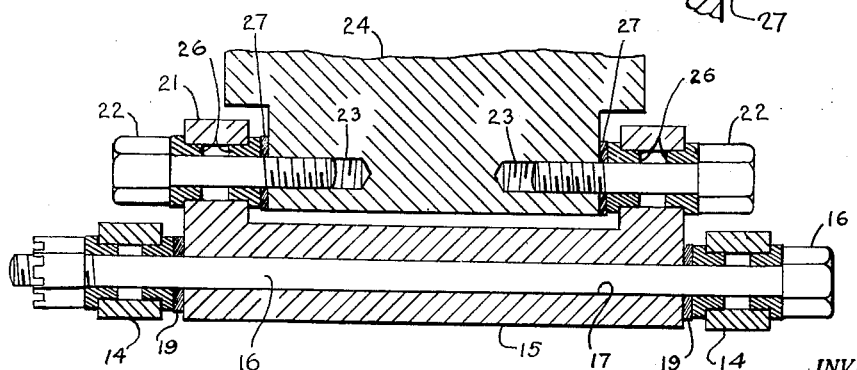
Fig. 5 is an enlarged cross-sectional view taken on line V—V of Fig. 2 and illustrating the details of the link mounting.

Fig. 6 is a substantially vertical cross-sectional view taken on line VI—VI of Fig. 1 and showing details of the link mounting; and Fig. 7 is a vertical, fragmentary, cross-sectional view of a modification of the resilient means for providing spring-back mounting of the assembly, and Figure 8 is an enlargement of a portion of Figure 5 and better illustrates the details of the spring washers incorporated in the apparatus to provide spring back.

It will be understood that the principles of the invention are broadly applicable to brakes adapted for a wide variety of uses. However, the invention is particularly concerned with brakes for vehicles, and specifically, automobiles, and, accordingly, the invention has been so illustrated and will be so described.

In the drawings, the numeral 1 indicates an automobile axle upon which bearings 2 rotatably support a hub 3. A wheel 4 is removably secured in known manner to the hub 3 and a disc 5 having an integral attaching flange 6 is also secured to the hub. Bolts 7 show one typical means for securing the wheel and the brake disc flange 6 to the hub, although it is obvious that other means may be employed.

Figure 4:
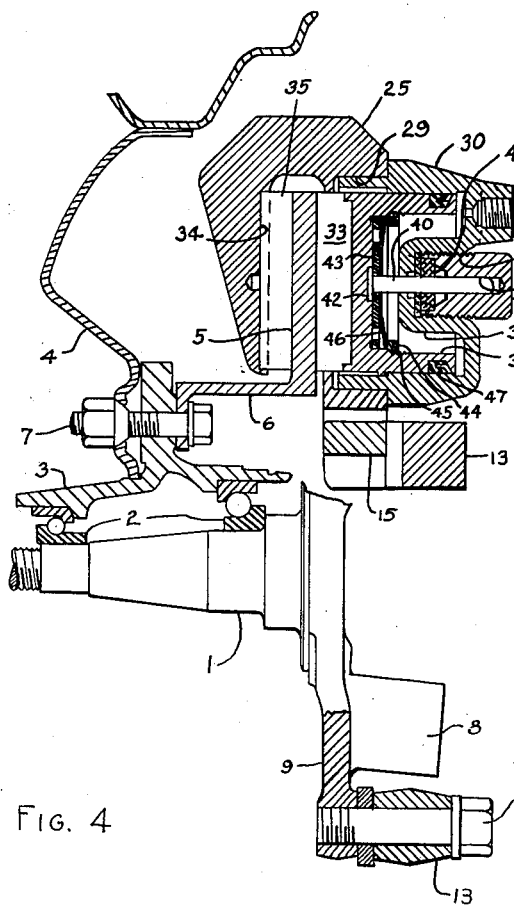
Fig. 4 is a sectional view through the brake assembly taken substantially on line IV—IV of Fig. 1.
Figure 3:
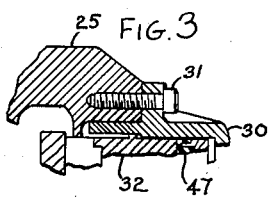
Fig. 3 is a sectional view taken substantially on line III—III of Fig. 1, and illustrating details of mounting the pressure cylinder in the C-shaped element of the brake.

The axle 1 illustrated in Figs. 1 and 4 of the drawings, is the front wheel axle of an automobile, and as best seen in Fig. 1, includes hinge knuckles 8 by which the axle is pivotally mounted on the vehicle in such manner that the wheels can be turned by the steering apparatus. The axle 1 and knuckles 8 are preferably formed integral, and are provided with integral downwardly extending lugs 9, and with an integral upwardly extending lug 10. Secured to the lugs 9 and 10 by cap screws 11 and 12 is a yoke member, indicated as a whole by the numeral 13, and having roughly a C-shape in side elevation as illustrated in Fig. 1. Fig. 6 illustrates how the yoke 13 is formed with integral laterally extending ears 14 which pivotally support a U-member 15. Details of the U-member 15 are best seen in Figs. 1, 5 and 6 of the drawings. The pivotal supporting action between the ears 14 of the yoke 13 and the U-member 15 is achieved preferably by means of a bolt 16 which extends through suitable apertures in the ears 14 and which is received in a hole 17 in the U-member.

An important feature of the invention is the provision of "Oilite" bearings 18 between the bolt 16 and the apertures in the ears 14. These "Oilite" bearings, made in the half spool shape shown, are of any suitable self-lubricating material of, for example, known powdered metal and soaked oil or graphite composition. Also associated with each bearing is a "Belleville"

spring 19, which is the trade name for a spring in the shape of a washer, the washer having a normal concavity which is flattened when the bolt 16 is tightened into place, so that the flattened washer spring exerts a tensioning thrust axially of the bolt 16. The advantageous functional result of the use of the spring washers 19 will be described hereinafter in explaining the operation of the brake assembly. A castle nut and cotter key is usually employed with the bolt 16.

In Fig. 7 is shown a modification of the means for providing resilient spring-back. Specifically, the "Belleville" springs 19 and 27 are replaced by rubber gaskets or washers 20 which effect dirt seals and provide spring-back for clearance. The rubber washers 20, prior to being compressed as shown in Fig. 7, are thicker than the flanges of the spools 18 so that the sealing and spring-back action noted are obtained.

Figure 2:
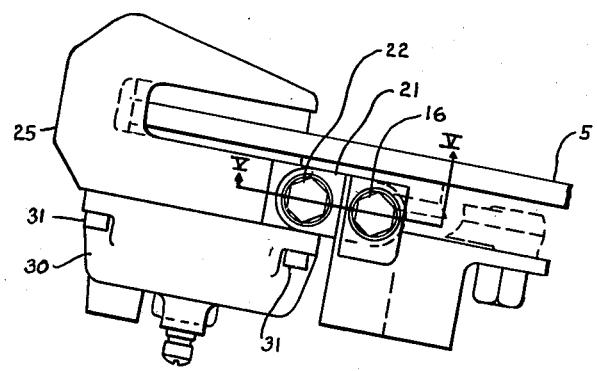
Fig. 2 is a plan view of the structure shown in Fig. 1.

The U-member 15 is in turn formed with legs or lugs 21, as seen in Figs. 1 and 5, and screws 22 extend through suitable apertures in the legs 21 and are received in appropriately tapped holes 23 in an end portion 24 of a C-clamp, indicated as a whole by the numeral 25, which clamp 25 extends around the brake disc 5 in the manner illustrated in Figs. 2 and 4. Self lubricating bearings 26 of half spool shape are positioned between the screws 22 and the legs 21 of the U-member 15, and again a concave spring washer 27 provides resiliency axially of the screws 22. Set screws 28 lock the screws 22 in place. Of course, the "Belleville" spring washers 27 may be replaced with rubber washers 20, as shown in the modification of Fig. 7.

C-clamp 25 is formed with an appropriate bore 29 which removably receives a cylinder 30 which is secured in the bore by screws 31. The cylinder 30 slidably receives a piston 32 which removably carries at its closed end a round plug 33 of friction material which is adapted to be moved against the side of the brake disc 5. The portion of the C-clamp 25 opposed to the plug 33 of friction material is likewise provided with a recess 34 which removably receives a round plug 35 of friction material which is adapted to engage with the opposite side of the brake disc 5.

The head of the cylinder 30 is formed with a central, inwardly directed boss 36 which is internally threaded, as at 37, and which receives a threaded plug 38 having a recess 39. Extending through an aperture in the bottom of the boss 36 is a pin 40 which extends into the recess 39 of the plug 38. The plug compresses packing 41 into engagement with the pin 40 so that the pin is frictionally held against movement until certain predetermined forces have been exceeded. The end of the pin 40 is headed, as at 42, and is received in a suitable recess in the inside of the head of the piston 32, and a round plate 43 slidably mounted on the pin 40 extends snugly inside of the skirt of the piston 32, but is free to move with respect thereto. An externally threaded collar 44 is screwed in on threads 45 on the inside of the skirt of the piston 32 and engages with a concave washer spring of the type heretofore mentioned, and identified by the numeral 46. The spring 46 engages with the plate 43.

Completing the assembly is a gasket 47 positioned between the piston 32 and the cylinder 30, and a conduit 48 supplies fluid under pressure to the cavity in the cylinder behind the piston.

In the operation of the brake assembly described, when fluid under pressure is admitted through the conduit 48 to the cylinder 30, the piston 32 is moved in a direction out of the cylinder towards the C-clamp 25 (in Fig. 4 of the drawing the piston moves to the left). This will move the plug 33 of friction material against one side of the brake disc 5, and at this time the entire C-clamp 25 will move in the opposite direction to bring the plug of friction material 35 into engagement with the opposite side of the brake disc 5. (In Fig. 4 of the drawings as plug 33 of friction material is moved to the left into engagement with the right hand side of the brake disc 5, the C-clamp 25 moves to the right to bring the plug 35 of friction material into engagement with the left hand side of the brake disc 5.)

It will be recognized that the movement of the C-clamp 25 in the manner just described is made possible by the double hinge mounting of the C-clamp with respect to the fixed portions of the brake assembly, namely, the axle 1. More specifically, the U-shaped member 15 is pivotally secured at one end to the fixed arbor 13, and the other end of the U-member, namely the legs 21, are pivotally secured to the C-clamp. The self-lubricating bearings 18 and 26 in the hinge means mounting the C-clamp provide a relatively free movement of the C-clamp and allow it to adjust itself so that the plugs 33 and 35 of friction material have engagement over substantially their full surface areas with the brake disc 5, and this is true even after the plugs have had considerable wear. In fact, the mounting of the C-clamp permits readjustment of the position of the C-clamp as the plugs wear.

An important feature of the invention is that when the fluid pressure on the brake is released, the springs 19 and 27 in the hinge mounting of the C-clamp function to provide just enough resiliency and spring-back so that the plug 35 of friction material carried by the C-clamp 25 is moved a short distance away from the face of the brake disc 5 to reestablish brake clearance between the plug and disc. In actual practice, this clearance is relatively small, and it is possible for the spring washers 19 and 27 to function in the manner described even though the primary resiliency of these washers is in a direction axially of the bolt 16 and screws 22 forming the hinge pins. Figure 8 illustrates the position and operation of the washers with the outer edge of the washer engaging one member and the inner edge of the washer engaging the other member. Thus, the washers have a small torsional resiliency to aid in spring back and clearance as described. Additionally, it may be that the bolt 16 and screws 22 are subjected to slight torsional actions or stresses, and the relief of these stresses may assist in reestablishing the small clearance between the plug 35 and the brake disc 5. Also, the structural assembly is such that excessive movement of the assembly due to vibration and road shocks is prevented.

Returning now to the mechanism associated with the piston 32, as fluid under pressure is supplied by the conduit 48 to the back of the piston and the piston begins to move outwardly of the cylinder, the spring 46 is compressed between the collar 44 and the plate 43, the plate 43 being held in a stationary position by the pin 40. The resilient movement of the spring 46 is ordinarily enough to allow the plug 33 of friction material to move into engagement with the disc 5 and to cause the movement of the C-clamp 25 to bring the plug 35 of friction material into engagement with the opposite side of the disc 5. Upon the release of fluid pressure behind the piston 32, the spring 46 acts to return the piston 32 to retracted position.

It should be noted here that the movement of the piston as effected by the spring 46 is somewhat greater than twice the clearance between the brake disc 5 and either friction plug. This is because the plug 33 must move away from the disc 5 a distance about equal to twice the brake clearance so that as the C-clamp 25 moves in the manner heretofore described to move the plug 35 away from the brake disc 5, the plug 33 will still have a normal brake clearance with the brake disc 5.

In the operation of the brake, the continued application of the plugs 33 and 35 of friction material against the opposite sides of the brake disc 5 will gradually result in wear on the plugs so that there will come a time when the piston moves towards the brake disc to fully compress the spring 46 but without fully engaging the plugs 33 and 35 with full pressure against the brake disc 5. When this occurs, the pressure behind the piston 32 is sufficiently greater than the resistance to movement of the pin 40, as effected by the packing 41, that the pin 40, and plate 43, will move out with the piston to allow the full braking action of the piston. (In Fig. 4 of the drawings, the pin 40 will move to the left.) The pin 40 is thus established in a new position and will remain in this position until further wear of the brake occurs at which time the pin 40 will again reposition itself along with the plate 43 so as to reestablish the normal functioning of the brakes, and to maintain the clearances between the plugs 33 and 35 and the brake disc 5 at a normal minimum amount even after extended wear of the plugs.

It will be recognized from the foregoing that the various objects of the invention have been achieved by the provision of a simple, rugged, relatively inexpensive and operative brake mechanism which is adapted to function over long periods of time with a minimum of attention or repair. The brake operates with a minimum of clearance, and thus pedal movement, even after extended wear of the friction material in the brake. The double hinge mounting of the C-clamp in the brake assembly insures that the C-clamp can readily move to allow full area surface bearing and pressure of the friction means of the brake at all times during the operation of the brake, and after any amount of wear on the friction plugs in the brake. Furthermore, the improved brake assembly is particularly adapted for use with vehicles and specifically automobiles, being readily associated with the front or rear wheels thereof.

While in accord with the patent statutes, one best known embodiment of the invention has been illustrated and described in detail, it is to be particularly understood that the invention is not to be limited thereto or thereby, but that the scope of the invention is defined in the appended claims.

What is claimed is:

1. The combination in a brake of a fixed member and a rotatable member, a brake disc carried with the rotatable member, a C-shaped element extending around the disc, means carried by the element for applying braking pressure to one side of the disc, link means pivotally securing the element to the fixed member and allowing movement of the element into full surface engagement with the disc upon actuation of the means for applying braking pressure, and resilient means associated with the link means and with the means for applying braking pressure for re-establishing braking clearance after brake applications and wear.

2. The combination in a brake of a fixed member and a rotatable member, a brake disc carried with the rotatable member, a C-shaped element extending around the disc, means carried by the element for applying braking pressure to one side of the disc, link means pivotally securing the element to the fixed member and allowing movement of the element into full surface engagement with the disc upon actuation of the means for applying braking pressure, and resilient means associated with the link means for re-establishing braking clearance after brake applications and wear.

3. The combination in a brake of a fixed member and a rotatable member, a brake disc carried with the rotatable member, a C-shaped element extending around the disc, means carried by the element for applying braking pressure to one side of the disc, link means pivotally securing the element to the fixed member and allowing movement of the element into full surface engagement with the disc upon actuation of the means for applying braking pressure, and resilient means associated with the means for applying braking pressure for re-establishing braking clearance after brake applications and wear.

4. The combination in a brake of a fixed member and a rotatable member, a brake disc carried with the rotatable member, a C-shaped element extending around the disc, means carried by the element for applying braking pressure to one side of the disc, and link means pivotally securing the element to the fixed member and allowing movement of the element into full surface engagement with the disc upon actuation of the means for applying braking pressure.

5. The combination in a brake of a fixed member and a rotatable member, a brake disc carried with the rotatable member, a C-shaped element extending around the disc, means carried by the element for applying braking pressure to one side of the disc, link means pivotally securing the element to the fixed member and allowing movement of the element into full surface engagement with the disc upon actuation of the means for applying braking pressure, a resiliently positioned piston associated with the means for applying braking pressure, a friction positioned stop limiting the return movement of the piston, and means for repositioning the stop when the pressure stroke of the piston exceeds a given amount.

6. A brake assembly including an axle, a wheel journaled on the axle, an endless brake element carried with the wheel, pressure cylinder means for applying a spot of brake pressure to the element, link means pivotally secured to the axle and pivotally secured to the pressure cylinder means to allow proper contact between the brake element and the pressure cylinder means at all stages of brake wear and holding the pressure cylinder means against rotation with the brake element, the pivotal connections between the link means and the axle and pressure cylinder having axes parallel to the plane of the brake element.

7. A brake assembly including an axle, a wheel journaled on the axle, an endless brake element carried with the wheel, pressure cylinder means for applying brake pressure to the element, means pivotally secured to the axle and pivotally secured to the pressure cylinder means to allow proper contact between the brake element and the pressure cylinder means at all stages of brake wear and holding the pressure cylinder means against rotation with the brake element, said pivotal securing means having pivotal axes parallel to the plane of the brake element.

8. A brake assembly including an axle, a wheel journaled on the axle, a brake disc carried by the wheel, a yoke fixed relative to the axle, a U-shaped member, pivotal connections securing the member at spaced points on its base to the yoke, a fluid pressure braking unit having portions positioned on opposite sides of the brake disc, the legs of the U-shaped member extending into proximity with the unit, pivotal connections securing the legs to the unit, means associated with the pivotal connections providing for spring-back to re-establish brake clearance between the unit and the disc, and resilient means in the unit providing brake clearance in an amount substantially twice the clearance provided by the spring-back.

9. A brake assembly including an axle, a wheel journaled on the axle, a brake disc carried by the wheel, a yoke fixed relative to the axle, a U-shaped member, pivotal connections securing the member at spaced points on its base to the yoke, a fluid pressure braking unit of C-shape straddling an arcuate portion of the brake disc, the legs of the U-shaped member extending into proximity with the unit, pivotal connections securing the legs to the unit, and means associated with the pivotal connections providing for spring-back to re-establish brake clearance between the unit and the disc.

10. A brake assembly including an axle, a wheel journaled on the axle, a brake disc carried by the wheel, a yoke fixed relative to the axle, a U-shaped member, pivotal connections securing the member at spaced points on its base to the yoke, a fluid pressure braking unit of C-shape surrounding an arcuate portion of the brake disc, the legs of the U-shaped member extending into proximity with the unit, and pivotal connections securing the legs to the unit.

11. The combination in a brake assembly of a rotatable brake disc, and a fixed member, pressure-applying hydraulic cylinder means, means pivotally supporting the pressure-applying hydraulic cylinder means on the fixed member so that it can apply braking pressure on the rotatable brake disc, and resilient means associated with the pivotal supporting means for insuring spring-back of the pivotal supporting means to provide brake clearance, said pivotal supporting means having pivotal axes parallel to the plane of the brake disc.

CARL E. BRICKER.

REFERENCES CITED

The following references are of record in the file of this patent:

UNITED STATES PATENTS

| Number | Name | Date |
| --- | --- | --- |
| 2,150,631 | Piron | Mar. 14, 1939 |
| 2,167,508 | Herold | July 25, 1939 |
| 2,236,898 | Eksergian | Apr. 1, 1941 |
| 2,288,059 | Williams | June 30, 1942 |
| 2,294,452 | Guy | Sept. 1, 1942 |
| 2,351,041 | Hawley | June 13, 1944 |
| 2,380,803 | Tack | July 31, 1945 |
| 2,392,970 | Bricker | Jan. 15, 1946 |
| 2,460,248 | Baselt | Jan. 25, 1949 |